United States Patent [19]
Nhu

[11] Patent Number: 5,771,338
[45] Date of Patent: Jun. 23, 1998

[54] ERROR DIFFUSION ARCHITECTURE WITH SIMULTANEOUS PRINT AND STORE DATA PATHS FOR CONVERTING A SCANNED IMAGE INTO MULTIPLE COPIES OF A PRINTED IMAGE

[75] Inventor: Hoang Nhu, Irvine, Calif.

[73] Assignee: Hewlett-Packard Company, Palo Alto, Calif.

[21] Appl. No.: 721,285

[22] Filed: Sep. 26, 1996

[51] Int. Cl.⁶ .............................. H04N 1/00; H04N 1/40; G06F 15/00

[52] U.S. Cl. ...................... 395/109; 395/115; 395/116; 358/261.4; 358/444

[58] Field of Search ...................... 395/109, 111, 395/112, 113, 114, 115, 116; 358/404, 444, 458, 461, 463, 261.4; 345/508, 511, 516, 520, 521, 526

[56] References Cited

U.S. PATENT DOCUMENTS 5,047,955  9/1991  Shope et al. ............................ 395/116
5,559,933  9/1996  Boswell .................................. 395/114

*Primary Examiner*—Edward L. Coles
*Assistant Examiner*—Mark Wallerson

[57] ABSTRACT

A color copier machine includes a conventional image scanner for scanning successive swaths of an original document into an image memory and a conventional high quality four-color inkjet printing mechanism for printing each swath as an array of pixels each covered with up to three types of ink (black and one color or three colors). A monotone image is scanned only once and subsequent copies are printed from the half toned data stored in the image memory. The first copy is printed while the scanner is scanning, with each 8-bit pixel in the scanned image being printed and stored as a 1-bit (on or off) pixel (in the half-tone image. Print time for subsequent copies is less than that required for scanning/printing the first copy because in at least the black-only printing mode of a typical inkjet printer, the time required to scan and process a single swath is more than the time required to print that swath.

5 Claims, 4 Drawing Sheets

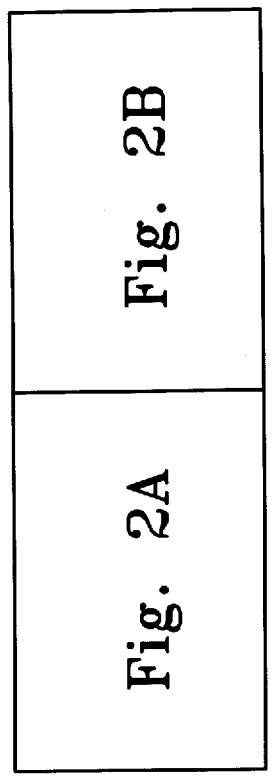

5,771,338

ERROR DIFFUSION ARCHITECTURE WITH SIMULTANEOUS PRINT AND STORE DATA PATHS FOR CONVERTING A SCANNED IMAGE INTO MULTIPLE COPIES OF A PRINTED IMAGE

TECHNICAL FIELD

The present invention relates generally to processing of digital image data and more particularly to printing multiple copies of a scanned image using a high quality inkjet printer implementing an error diffusion process.

BACKGROUND ART

Grey scale images may be represented in digital form as picture elements ("pixels") of a predetermined size sufficiently small that they blend together when viewed by the naked human eye. A typical pixel size is 300 per inch, with an intensity measured on a scale of 0 to 255 (8 bits). Color images are typically represented as superimposed "planes", each corresponding to a different color of ink. High quality color printing typically uses four colors: black ("K"), cyan ("C"), magenta ("M") and yellow ("Y"), resulting in a total of 4×8=32 bits per pixel.

Various half-tone and dithering processes are known in which a high contrast process (such as printing) is used to reproduce a low contrast image (such as a photograph) whereby average intensity (e.g., the ratio of black pixels to white pixels) of a particular area of the lower resolution image corresponds to the average intensity of the corresponding area of the original image. An example of a computationally intensive image processing algorithm whereby a high contrast printing process may be used reproduce a low contrast image is "error diffusion" in which any error remaining when a particular pixel is printed is propagated to one or more downstream pixels that have not yet been processed.

DISCLOSURE OF INVENTION

A copier machine includes a conventional image scanner for scanning successive swaths of an original document into an image memory and a conventional inkjet printing mechanism for printing each swath as an array of dots of ink (pixels). Since the scanned image may include many levels of grey (typically 256) and the dots produced by the inkjet printing process are typically located on a fixed grid and are typically all of the same size and density, the present invention contemplates that a computationally intensive half-toning process such as error diffusion will be used to convert the grey-scale data into binary commands indicating whether or not each pixel location is to receive a drop of ink.

In accordance with the invention, at least in a black and white (monotone) mode, the original image is scanned only once as a grey scale image which is converted into a half tone image which is then stored in an image memory, and subsequent copies are printed from the half toned data stored in the image memory. Accordingly, since the image is typically scanned as a series of swaths, the addressable image memory does require sufficient available memory to store the entire original image, but only the entire half toned image. The first copy is printed while the scanner is scanning, thus reducing the elapsed time required to scan and print the first copy, and also reducing the amount of memory that would otherwise be required, since each 8-bit pixel in the scanned image is replaced with a 1-bit pixel in the half-tone image. Print time for subsequent copies is less than that required for printing the first copy because in the black-only printing mode of a typical inkjet printer, the time required to scan and process a single swath is more than the time required to print that swath. This scan-once approach in the multi-copy mode also has the advantage of reducing wear-and-tear in the scanner subassembly. The same architecture could also be used for multicopy, color mode, assuming that the image memory has sufficient capacity to store an entire page of full color half-toned (error diffused) data (about four megabytes at 300 dpi). However, in a presently contemplated preferred embodiment, the addressable image storage capacity is only one megabyte and the apparatus also includes a conventional color copy mode in which the printed image data is not stored in the addressable memory, and each copy is scanned and printed one swath at a time.

PREFERRED MODE FOR PRACTICING THE INVENTION

Figure 1:
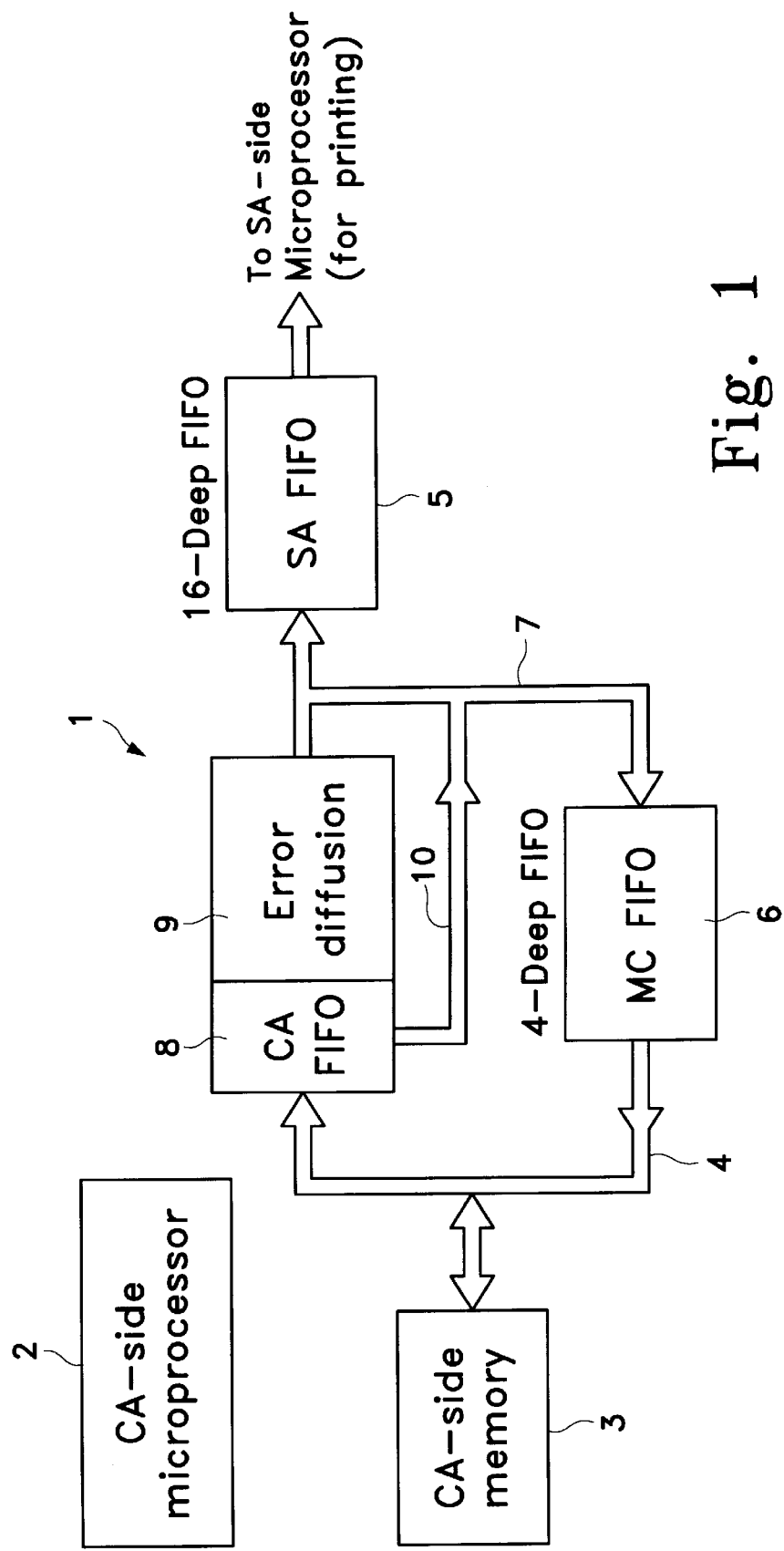
FIG. 1 is a block diagram showing the data flow between the error diffusion logic, the input scanner, and the printer.

Reference should now be made to FIG. 1, which is a block diagram showing the data flow between the half tone (error diffusion) processor 1, an input image processor (for example, an Intel CA960) 2 with an associated 8-bit addressable image memory 3 (preferably having a capacity of at least 1 megabyte), a 16-bit wide CA-side bus 4, a 16-bit wide and 16 word deep SA FIFO 5 which acts as a buffer between the half tone processor 1 and the printer microprocessor (typically an Intel SA960, not shown), a 4 word deep multicopy FIFO (First In First Out) 6, and a 16-bit wide SA-side bus 7. The SA-side bus 7 connects the half tone processor 1, the SA FIFO 5, and the multicopy FIFO 6. The half tone processor 1 includes a CA FIFO 8 which functions as an input buffer, logic 9 for implementing the error diffusion and color overprinting functions and an alternative direct path 10 between the CA-side memory 3 and the SA FIFO 5.

In multicopy, black copy mode, the image is scanned only once, and after it has been processed into an error diffused half-toned image in the error diffusion processor 1, the resultant lower resolutions output image is simultaneously output to the SA FIFO 5 and to the multicopy FIFO 6. From multicopy FIFO 6 the half toned data is stored in CA-side memory 3 for subsequent output directly (via direct path 10) to the SA FIFO 5, thereby not only storing the relevant image data in a form which requires less memory, but also eliminating any additional processing time that would be required for a second scanning of the image and/or a second processing of the grey scale image data into half-toned image data.

Figure 2A:
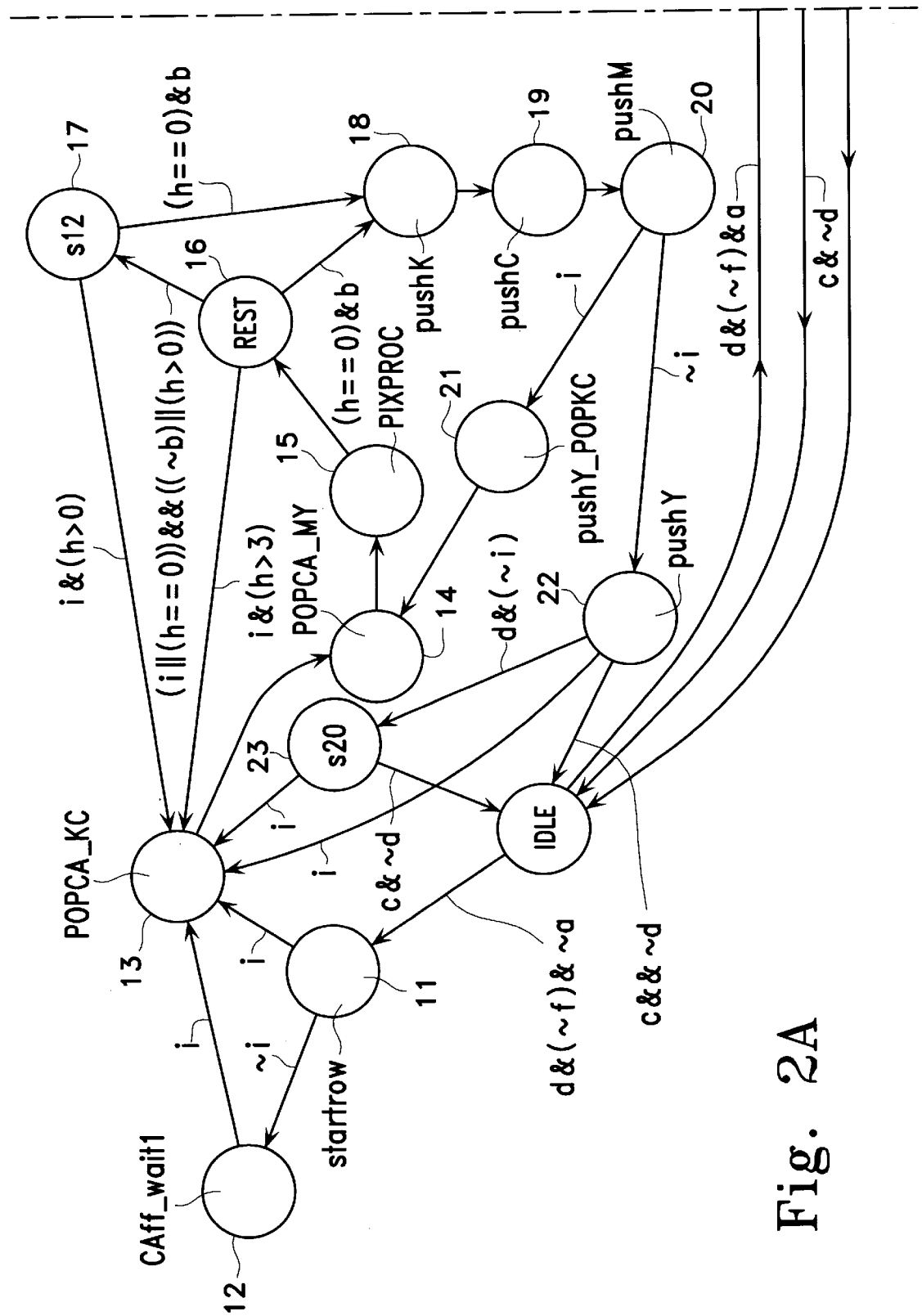
FIG. 2 which comprises FIG. 2A and FIG. 2B joined as indicated is a state diagram for the logic controlling the data flow for the various copy modes.
Figure 2B:
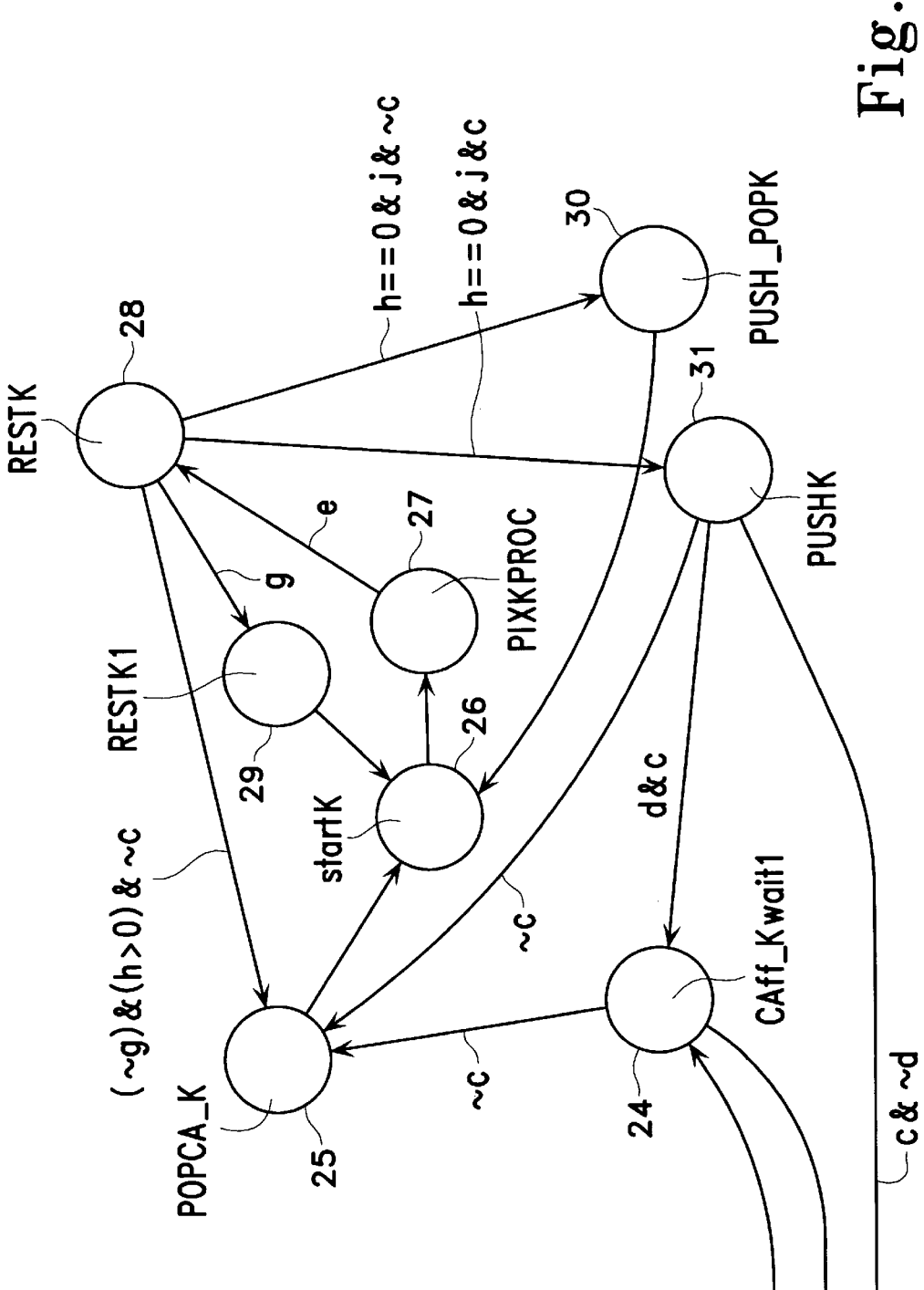

FIG. 2 shows a state machine for controlling the data paths between the various memory and error diffusion processing blocks of FIG. 1, depending on whether the image currently being printing is a first copy that is being converted into a half-toned image and printed as the image is scanned, or a second copy that is printed from previously stored half toned data.

In the state diagrams of FIG. 2, the various control signals controlling the branching from one state to the next state are identified as follows:

| code | control signal | meaning |
| --- | --- | --- |
| a | b_n_c | black mode (not color mode) |
| b | burst_WOK | 4 empty 16-bit words in SA FIFO (1 word for each plane) |
| c | CAempty | no data in CA FIFO |
| d | dma2on | direct memory access enabled |
| e | ed_done | error diffused data available for current pixel |
| f | p_n_c | print mode (not copy mode) |
| g | pixpair_cnt[0] | odd number of pixels in process |
| h | pixpair_cnt[3:0] | number of pixels in process, not yet output (4 bits) |
| i | pop2OK | 2 16-bit words available from CA RAM |
| j | WOK | empty 16-bit word available in both SA FIFO and MC FIFO |

As is conventional, the symbol "&" means logical and, the symbol "|" means logical or, and the symbol "~" means not.

Referring again to FIG. 2, it may be seen that the data flow process includes a color copy (dma2on&(~p_n_c)&~b_n_c) loop (states 11, 12, 13, 14, 15, 16, 17, 18, 19, 20, 21, 22, and 23) and a black copy (dma2on&(~p_n_c)&b_n_c) loop (states 24. 25, 26, 27, 28, 29, 30, 31 and 32). The color copy loop 11–23 includes a four-color error diffusion process (state 15: PIXPROC) which, once two 16-bit words (each corresponding to two of the four color planes K, C, M & Y of a single input pixel) are available (black and cyan during states 21: pushY_POPKC or 13: POPCA_KC; magenta and yellow during state 14: POPCA_MY) from the CA FIFO 8, (pop2OK) successively processes the four planes represented by those two words into four binary bits defining which of the four colors of ink are to be applied to a single location (output pixel) in the printed image. Once four pixels for each of the four planes have been processed (pixpair_cnt[3:0]==0), the data is output to the SA FIFO (state 18: pushK, state 19: pushC, state 20: pushM and states 20: push Y or 21: pushY_POPKY, which respectively cause four successive black, cyan, magenta or yellow pixel values to be stored in the nest available location of SA FIFO 5) and the process is repeated until there is not a full pixel of data in the CA FIFO 8 (~pop2OK) and further direct memory access has been disabled (~dma2on). Black loop 24–31 similarly processes black pixels from the CA FIFO 8 (reading a pair of pixels during a single access of CA FIFO 8 during states 25: POPCA_K or 30 PUSH_POPK, and processing the second pixel of the pixel pair read by means of a second pass through the monotone error diffusion process 27: PIXKPROC via states 29: RESTK1 and 26: startK) until it is empty (CAempty). 16 bits of output data representing 16 pixels in the black plane are stored into both SA FIFO 5 and the multicopy FIFO 6 (states 30: PUSH_POPK or 31: PUSHK) once 16 8-bit input pixels have been processed (pixpair_cnt[3:0]==0) and space is available in both the SA FIFO 5 and the multicopy FIFO 6 (WOK), preferably (state 30: PUSHK_POPK) writing the output data into SA FIFO 5 and the multicopy FIFO 6 concurrently with reading data from CA FIFO 8 in the event the CA FIFO 8 is not yet empty (~CAempty). Otherwise, the output data is written (state 31: PUSHK) and then the process pauses (state 24: CAff_Kwait1) until the CA FIFO becomes available for a subsequent read (state 25: POPCA_K).

The half-toned data in the multicopy FIFO 6 is then stored in the CA-side memory 3. When printing a second copy, the error diffused data stored in the CA-side memory 3 may be read directly into the SA FIFO 5 via the CA FIFO 8 and the direct path 10.

In the preferred embodiment which also includes a high quality four-color mode, the processing includes not only calculation of a corrected grey scale pixel, but also determining which colors are to be turned on (printed with a corresponding dot of ink) at each pixel location based on which two planes have the largest corrected pixel values and/or whether a color overprint mode is being used to provide a more intense black in the darker portions of the image. Concurrent processing ("pipelining") is used to reduce overall processing time and thereby maximize throughput.

For further details as to how the relevant processing may be accomplished including a particularly efficient hardware implementation of the previously mentioned error diffusion process, reference is made to my commonly assigned application entitled, which is being filed concurrently herewith under docket number OPTIMALLY PIPELINED ERROR DIFFUSION ARCHITECTURE FOR CONVERTING SCANNED IMAGE INTO FOUR-COLOR PRINTED IMAGE and which is hereby incorporated by reference in its entirety.

What is claimed is:

1. Copy apparatus comprising:

a dedicated half-tone processor for converting a scanned image data with many intensity levels into printed image data having only a few intensity levels;

a scanned image processor operable independently of the dedicated half-tone processor for inputting the scanned image data from a scanning mechanism an addressable image memory associated with the scanned image processor a scanned image buffer for coupling an input of the dedicated half-tone processor to the addressable memory;

a multicopy buffer for coupling an output of the dedicated half-tone processor to the addressable memory;

a printed image processor operable independently of the dedicated half-tone processor and the scanned image processor for outputting the printed image data to an ink jet printing mechanism; and a printed image buffer for coupling said dedicated half-tone processor output to the printed image processor;

wherein at least in a multicopy black mode, a second copy of the scanned image is output from the addressable memory to the printed image buffer, bypassing the dedicated half-tone processor.

2. The copy apparatus of claim 1, wherein the dedicated half-tone processor implements an error diffusion algorithm in which any error remaining when a particular pixel is printed is propagated to one or more downstream pixels that have not yet been processed.

3. The copy apparatus of claim 1, wherein the time required to scan an original image is greater than the time required to print a half-tone image.

4. The copy apparatus of claim 1, wherein the addressable memory does not have sufficient available memory to store the entire original image, but does have sufficient available memory to store the entire half toned image.

5. The copy apparatus of claim 1, wherein the apparatus also includes a color copy mode in which the printed image data is not stored in the addressable memory.

* * * * *